(12) United States Patent
Wang

(10) Patent No.: US 7,478,772 B2
(45) Date of Patent: Jan. 20, 2009

(54) CRUSHING AND GRINDING DEVICE, A SOYBEAN MILK MAKER INCLUDING SAID DEVICE AND A METHOD FOR MAKING SOYBEAN MILK

(76) Inventor: Xuning Wang, No. 601 Jingqi Road, Huaiyin District, Jinan City, Shandong Province, 250021 (CN)

( * ) Notice: Subject to any disclaimer, the term of this patent is extended or adjusted under 35 U.S.C. 154(b) by 0 days.

(21) Appl. No.: 11/303,879

(22) Filed: Dec. 16, 2005

(65) Prior Publication Data

US 2006/0157602 A1    Jul. 20, 2006

Related U.S. Application Data

(63) Continuation of application No. PCT/CN2004/000642, filed on Jun. 15, 2004.

(30) Foreign Application Priority Data

Jun. 17, 2003   (CN)   ................................. 03 1 12423
Jun. 17, 2003   (CN)   ................................. 03 1 12424

(51) Int. Cl.
   *B02C 1/08*   (2006.01)
   *B02C 23/02*  (2006.01)
(52) U.S. Cl. ........................ 241/224; 241/242; 241/253; 241/260
(58) Field of Classification Search ............ 241/152.1, 241/160, 162, 224, 242, 248, 253, 260
   See application file for complete search history.

(56) References Cited

U.S. PATENT DOCUMENTS

| 2,549,275 | A | * | 4/1951 | Wood | 241/246 |
| 2,906,310 | A | * | 9/1959 | Schnell | 241/56 |
| 3,488,008 | A | * | 1/1970 | Bodine | 241/49 |
| 3,952,958 | A |   | 4/1976 | Rich | |
| 4,037,798 | A | * | 7/1977 | Schnitzer | 241/101.2 |
| 4,109,873 | A | * | 8/1978 | Lichfield | 241/56 |

(Continued)

FOREIGN PATENT DOCUMENTS

CN    88211154 U    9/1988

(Continued)

OTHER PUBLICATIONS

International Search Report for International Application No. PCT/CN2004/000642 dated Oct. 21, 2004.

*Primary Examiner*—Bena Miller
(74) *Attorney, Agent, or Firm*—Jones Day

(57) ABSTRACT

The present application discloses a recirculating crushing and grinding device for crushing and grinding liquid-like materials or materials that contain liquid, said device comprises a motor, a hopper, a crushing and grinding part and a material recirculating part. Said crushing and grinding part includes a coarse-crushing section and a fine-grinding section, said fine grinding section consists of a pair of grinding components, and said material recirculating part consists of a pump and recirculating ducts provided downstream of said crushing-grinding part. The present application also discloses a soybean milk maker employing said recirculating crushing-grinding device, and a method for crushing and grinding a recirculated material and a method for producing soybean milk. The equipment disclosed in the present invention is easy to manufacture, with the advantages of a low noise during operation and low energy consumption.

10 Claims, 8 Drawing Sheets

U.S. PATENT DOCUMENTS

| | | | | |
|---|---|---|---|---|
| 4,196,224 A | * | 4/1980 | Falk | 426/483 |
| 4,343,437 A | * | 8/1982 | Czelen | 241/169.1 |
| 4,613,086 A | * | 9/1986 | Granum et al. | 241/101.8 |
| 4,634,061 A | * | 1/1987 | Williams | 241/101.01 |
| 4,905,915 A | | 3/1990 | Ikebuchi et al. | |
| 5,836,523 A | * | 11/1998 | Johnson | 241/5 |

FOREIGN PATENT DOCUMENTS

| | | |
|---|---|---|
| CN | 2077196 U | 5/1991 |
| CN | 1021024 C | 6/1993 |
| CN | 1029502 C | 8/1995 |
| CN | 2273965 Y | 2/1998 |
| CN | 2299661 Y | 12/1998 |
| CN | 2464445 Y | 10/2001 |
| CN | 2460201 Y | 11/2001 |

* cited by examiner

CRUSHING AND GRINDING DEVICE, A SOYBEAN MILK MAKER INCLUDING SAID DEVICE AND A METHOD FOR MAKING SOYBEAN MILK

This application is a continuation of International Application PCT/CN2004/000642, filed Jun. 15, 2004, which is hereby incorporated by reference in its entirety.

TECHNICAL FIELD

The present invention relates to the field of crushing and grinding, and more particularly to a crushing and grinding device and a method for crushing and grinding a recirculated pulp material; and further to a soybean milk maker employing said crushing and grinding device and a method for making soybean milk.

BACKGROUND

In the conventional colloid mills used in the fields of medical, cosmetic, dope, fine chemical industry and food processing etc., which are either conical-structured or disc-structured, the milling movements are small due to the limitation of the size of the mill tool. In order to achieve a super-fine grinding of a material, the equipment is usually of bulky structure. Not only are the manufacturing processes of the rotating and stationary mill bodies thereof complicated and costly, but also the motor has to run at very high speed, generally around 8000 rounds per minute, resulting in a loud noise during operation and a large consumption of power.

In the prior art domestic soybean milk maker, in order to achieve miniaturization, the grinding device is driven by a high-speed motor so that the crushing blades hit and crush the beans in filter gauze, with soybean milk filtered through the gauze and then boiled for drinking. Notable disadvantages thereof are: requirement of high rotation speed of the blades, large noise caused during operation, a low production rate of soybean milk, small regulating range of soybean milk concentration and quantity, and difficulty in gauze cleaning. As disclosed in CN2273965Y, "an automatic cycle mini soybean-milk maker of assembled type", the grinding device thereof consists of a stator (i.e. a stationary grinder) and a rotor (i.e. a rotary grinder). The inventor believes that both the design and manufacture of the stator and the rotor are complicated and difficult, and it is impossible to obtain an integrated structure under conventional processes and technology, thus an assembled arrangement is employed for the stator and rotor, which results in a large number of mill parts, huge labor in assembling, and a high failure rate. Its operation principle is that material is pulled and pushed and thus crushed and ground by a cyclic force caused by the high-speed relative motion between the assembled stator and rotor, so that the material "escapes with high speed from the lower annular gap after being ground". Thus, the high rotation speed also brings about a disadvantage of large noises.

CONTENTS OF THE INVENTION

In view of above-mentioned disadvantages in the conventional colloid mills, the aim of present invention is to provide a crushing and grinding device for grinding liquid-like materials or materials that contain liquid, and a method thereof. Said device can be miniaturized and manufactured easily, with a low noise and low energy consumption.

The present invention also provides a soybean milk maker and a method for making soybean milk. Said soybean milk maker employs said crushing and grinding device and is capable of overcoming the problems existing in the prior art soybean milk maker, such as large noises, low milk production rate, etc. Said soybean milk maker is suitable for both household and commercial use.

The crushing and grinding device provided in the present invention mainly consists of a motor, a hopper, a crushing and grinding part and a material recirculating part, characterized in that said crushing and grinding part includes a coarse-crushing section and a fine-grinding section, said fine grinding section comprises a pair of grinding components, and said material recirculating part consists of a pump and recirculating ducts provided downstream of said crushing and grinding part.

Since the crushing and grinding device provided in the present invention comprises a coarse-crushing section and a fine-grinding section, and materials are recirculated through the coarse and fine grinding sections through an exterior recirculating mechanism, the rotation speed of the grinding components can be greatly reduced; thus the noise and energy consumption are reduced, too.

The present invention also provides a method for crushing and grinding liquid-like materials or materials that contain liquid. Said method includes the processes of material feeding, material crushing and grinding and material recirculating, characterized in that the material is finely ground after being coarsely crushed, then is recirculating outside of a crushing and grinding chamber through a pump and recirculating ducts which are provided downstream of the crushing and grinding part, so as to improve the fineness and uniformity of material particles in the slurry. The rotor has a rotation speed of 1000~3000 rounds per minute during crushing and grinding process.

In order to reduce noise and failure rate of a soybean milk maker and to improve the production rate of milk, the present inventor applies above crushing and grinding device in a soybean milk maker. A soybean milk maker employing such crushing and grinding device comprises a milk-producing section, a milk-boiling section and a circuit control system. The milk-producing section thereof consists of a motor, a hopper, a water tank, a crushing and grinding part and a material recirculating part, the milk-boiling section thereof comprises an electric heating device and a boiling cup, the circuit control system thereof comprises a control circuit board and a control valve assembly, characterized in that said crushing and grinding part includes a coarse-crushing section and a fine-grinding section, said fine grinding section comprises a pair of grinding components; and said material recirculating part consists of a recirculating pump, a control valve assembly and corresponding ducts which are provided in the downstream of said crushing and grinding part. An outlet of the recirculating pump is connected with an inlet of said control valve assembly, and one end of said recirculating duct is connected with an outlet of said control valve assembly, and the other end of said recirculating duct leads to the hopper.

A soybean milk maker of this type provided in the present invention is advantageous in that it is compact in structure, easy to assemble, with low failure rate and low noise. Furthermore, the milk production rate is high and it is easy to clean.

The present invention also provides a method for making soybean milk. The said method includes processes of material feeding, crushing, slurry producing and milk boiling, characterized in that the soybean is coarsely crushed and then is finely ground, after that, the ground material is recirculated outside of a crushing and grinding chamber through recirculating ducts, so as to improve the fineness and uniformity of material particles in the slurry. The rotor operates at a rotation speed of 1000~3000 rounds per minute during the crushing and grinding process.

In the above method, in order to further improve the milk production rate and the taste of the resulting soybean milk, water that is fed to the material is heated to 80° C.~95° C. before the material has been crushed and ground. The present invention also provides a water tank. Water in said tank can be pre-heated by a heating element so that the temperature of the slurry can be surely kept between 70° C.~93° C. when the slurry is recirculated outside the crushing and grinding chamber. The heated water in the water tank can also be used to clean the milk producing device automatically after milk producing procedures have been finished, so that the problem that the milk producing device is difficult to clean is also resolved.

When the crushing and grinding device of the present invention is used to grind materials, and when the soybean milk maker of the present invention is used to produce soybean milk, the rotor, preferably, operates at a rotation speed of 2800~2900 rounds per minute during the crushing and grinding process, which will not only satisfy the technical requirements, but also have the operation noise controlled within the range of 50~60 decibel.

Figure 1:
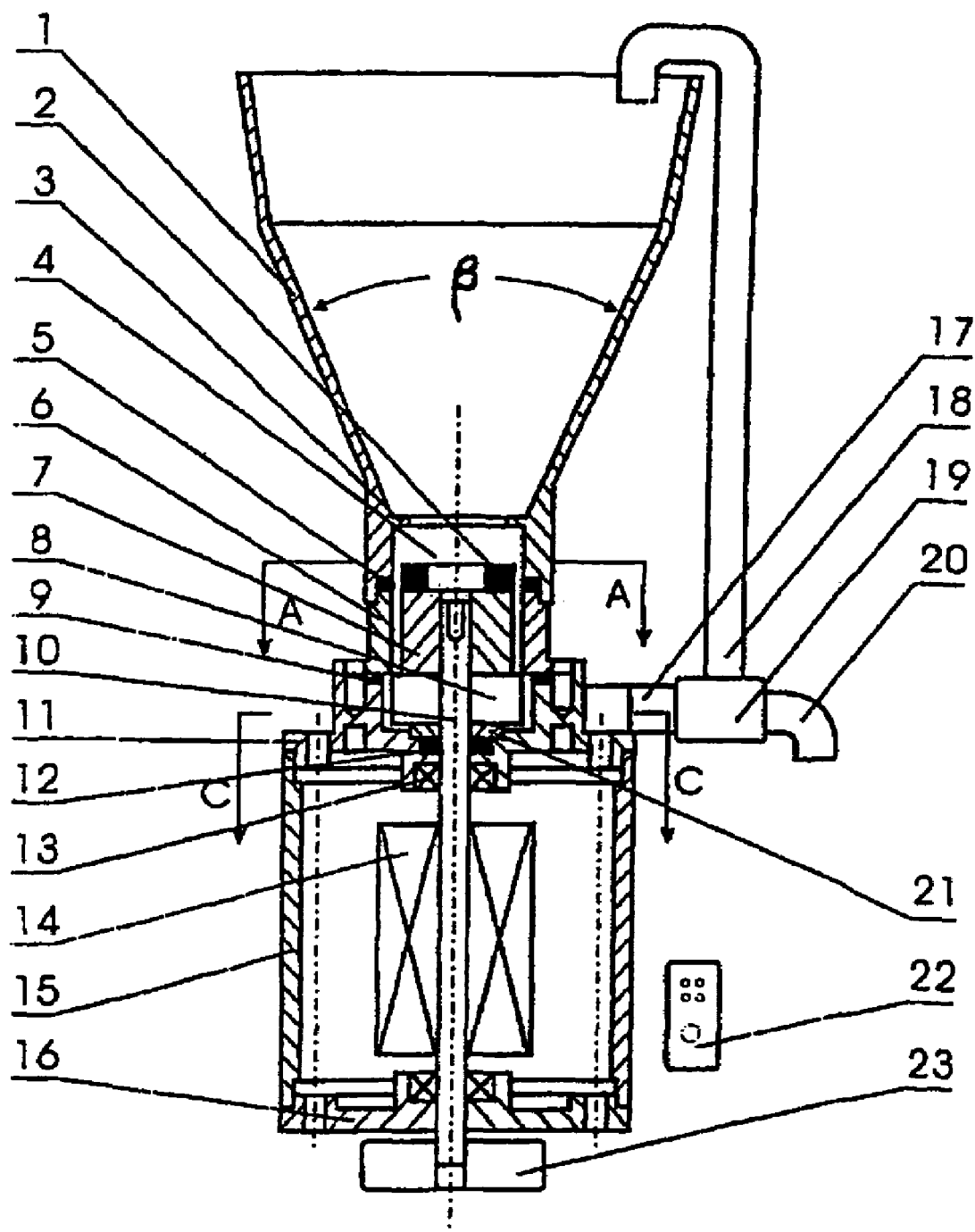
FIG. 1 is a structural schematic drawing of an embodiment of a crushing and grinding device according to the present invention.
Figure 2:
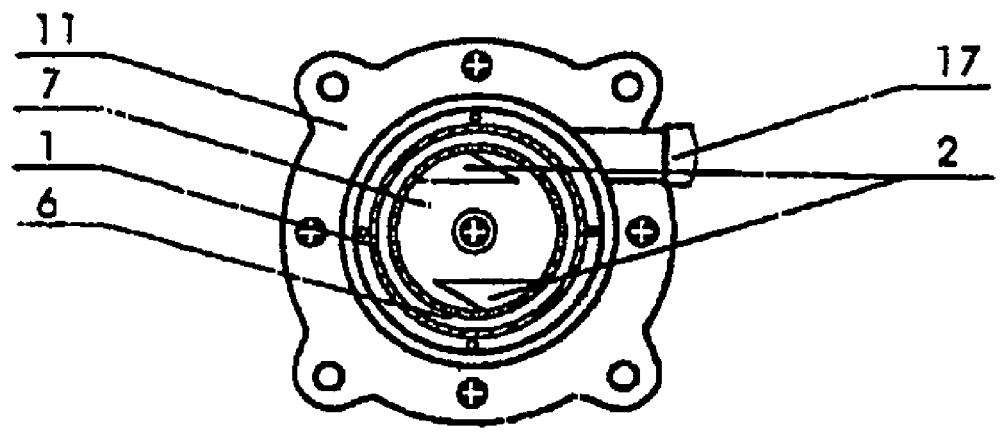
FIG. 2 is a cross-sectional view along line A-A of FIG. 1.
Figure 3:
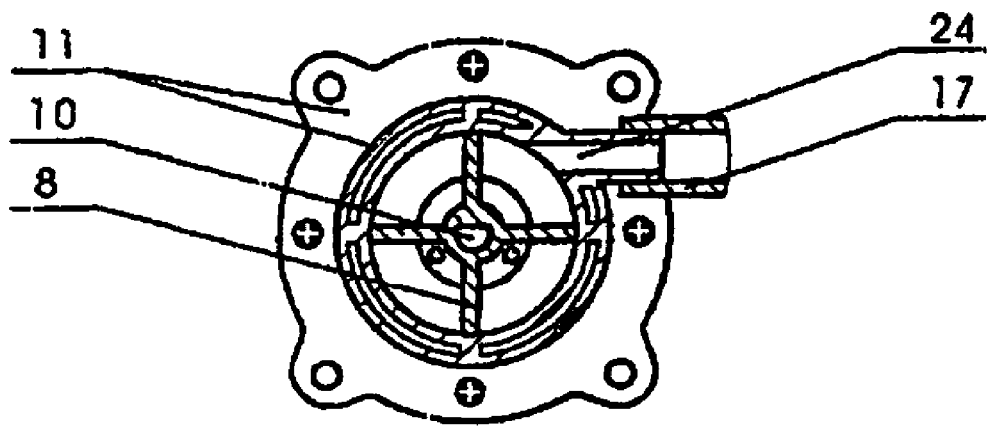
FIG. 3 is a cross-sectional view along line C-C of FIG. 1.

In these drawings, following elements are indicated: 1. hopper; 2. crushing blade; 3. retainer ring; 4. crushing chamber; 5. top seal ring of the stationary grinder; 6. stationary grinder; 7. rotary grinder; 8. impeller; 9. bottom seal ring of the stationary grinder; 10. motor shaft; 11. motor front cover; 12. seal ring of the motor shaft; 13. bearing of the motor shaft; 14. motor rotor; 15. motor casing; 16. motor back cover; 17. outlet duct; 18. recirculating duct; 19. control valve assembly; 20. slurry discharge duct; 21. cap for the seal ring of the motor shaft; 22. circuit controller; 23. fan blade; 24. expelling outlet; 25. hopper cover; 26. water feeder; 27. inlet duct of the water feeder; 28. recirculating duct for feeding slurry; 29. blowhole of the water feeder; 30. housing; 31. slurry inlet; 32. filter; 33. control circuit board; 34. anti-overflow electrode support; 35. anti-overflow electrode; 36. cap of the boiling cup; 37. boiling cup; 38. handle of the boiling cup; 39. drain duct; 40. electric heating discus; 41. base; 42. fixing plate of the heating device; 43. temperature sensor; 44. electrical heating tube; 45. water tank; 46. outlet duct of the water pump; 47. inlet duct of the water pump; 48. water level sensor; 49. water pump; 50. water intake valve; 51. control panel.

DETAILED DESCRIPTION OF THE PREFERRED EMBODIMENTS

Embodiment 1

The present invention will be further discussed in conjunction with the accompanying drawings and embodiments to give a better description of the present invention.

FIGS. 1, 2, 3, 4 show a preferred embodiment of a crushing and grinding device of the present invention. A fine grinding section of said device consists of a stationary grinder 6 and a rotary grinder 7 with mill teeth distributed uniformly on the inner wall of the stationary grinder 6 and the outer wall of the rotary grinder 7. The rotary grinder 7 is fitted inside the stationary grinder 6 with a dynamic rotating gap therebetween, the gap size being around 0.03~0.6 mm. The lower end of the stationary grinder 6 is fixed on a motor front cover 11 through bolts, with a bottom seal ring 9 of the stationary grinder provided between the lower side of the stationary grinder 6 and the motor front cover 11; the rotary grinder 7 is securely fitted on a motor shaft 10 with axial alignment and is fastened to the front end of the motor shaft 10 by screws; crushing blade 2 is integrally formed on the upper end surface of the rotary grinder 7 so that a coarse crushing section is formed. A recirculating system comprises a hopper 1, an impeller 8 of an impeller pump in a crushing and grinding chamber, an outlet duct 17, a control valve assembly 19, a recirculating duct 18 and a slurry discharge duct 20; the hopper 1 with a repose angle is fixedly screwed on the outer wall of the upper end of the stationary grinder 6, and a top seal ring 5 of the stationary grinder is provided at the top end of the stationary grinder 6 to ensure sealing; an outlet 24 is provided on the motor front cover 11; the impeller 8 of the impeller pump is arranged below the rotary grinder 7, and the impeller 8 is co-axial with the rotary grinder 7. In said embodiment, the impeller 8 and the rotary grinder 7 are integrally configured so that the structure of the entire recirculating crushing device is compact. The outlet duct 17 is connected with an inlet of the control valve assembly 19, and one end of the recirculating duct 18 is connected with one outlet of the control valve assembly 19, while the other end of the recirculating duct 18 leads to the hopper 1, and one end of the slurry discharge duct 20 is connected with the other outlet of the control valve assembly 19; a circuit controller 22 is connected with the motor and the control valve assembly 19; the motor front cover 11 is fastened on the motor casing 15 by bolts, and a shaft bearing 13 for the front end of the motor shaft 10 is securely embedded in the motor front cover 11, and a seal ring 12 of the motor shaft is provided above the motor shaft bearing 13, on the front end surface of which a capping 21 for the motor shaft seal ring is pressed. The motor can be forcedly cooled through the fan blades 23.

The control valve assembly 19 may be an electromagnetic valve, an electrically controlled change valve, and so on.

The repose angle of the hopper 1 is between 25°~40°, most preferably between 29°~35°, so that materials in the hopper 1 can flow downward smoothly.

Figure 4:
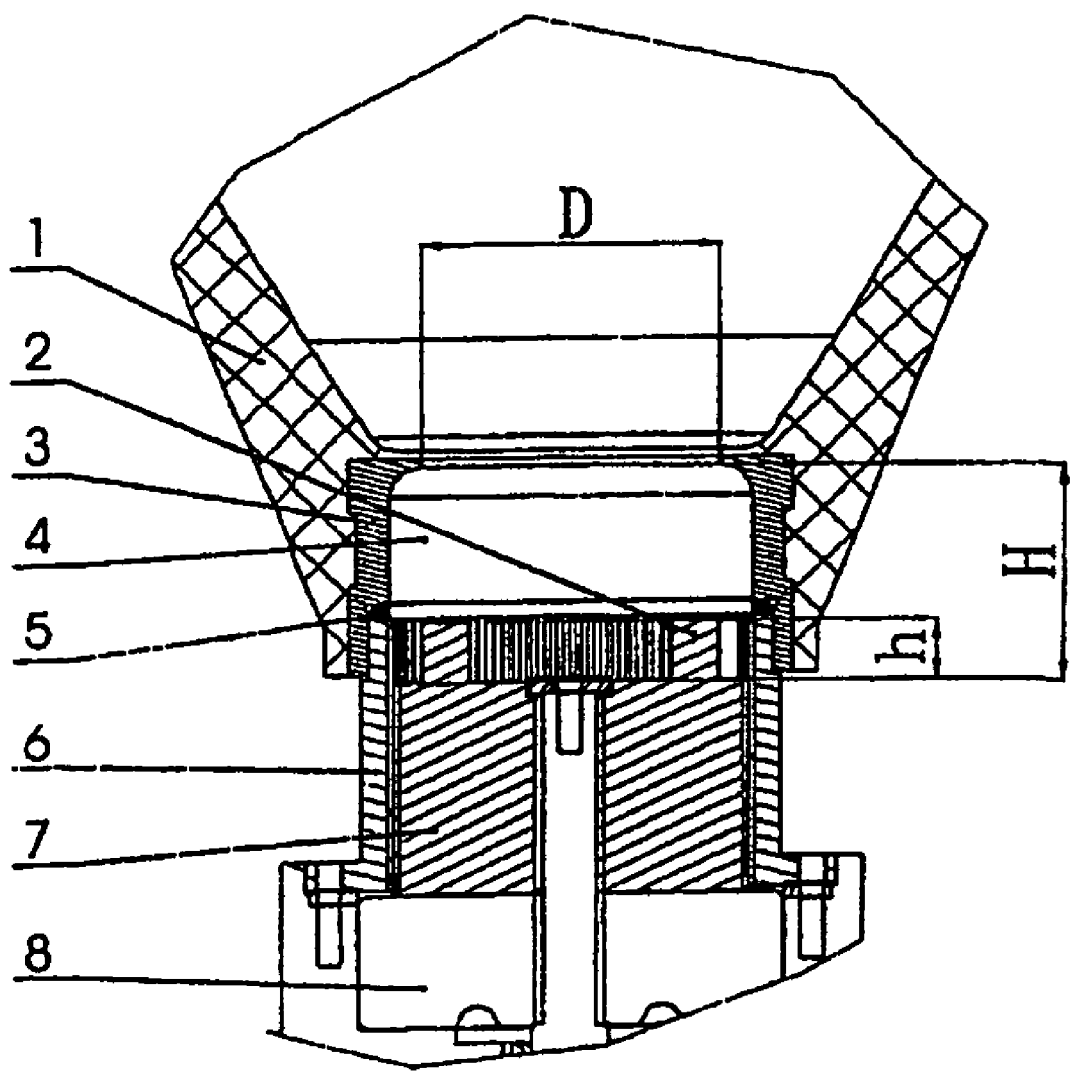
FIG. 4 is a partially enlarged view of a grinding chamber.

As shown in FIG. 4, a retainer ring 3 is provided at the lower end of the hopper 1 to prevent the material from overflowing upwardly during crushing, so as to ensure that the material is circulated through the crushing and grinding chamber from the top down to the bottom. When the rotary grinder 7 has a diameter of 46 mm, the inner diameter D of the retainer ring 3 should be between 15~50 mm, most preferably between 36~38.5 mm. When said size is between 36~38.5 mm, the device can grind at high speed and with high efficiency, while a smaller or larger size would lead to an non-smooth down-flow of the material or result in a small amount of the material being unable to enter into the crushing chamber 4 when the grinding process approaches the end. Meanwhile, the height H of the crushing chamber 4 should be between 10~35 mm, most preferably between 18~21 mm. In this most favorable height range, the device can achieve a high grinding velocity and a high efficiency. It is difficult for the material in the hopper 1 to enter into the crushing chamber 4 when H is greater than said value, or the material may not flow down smoothly when H is less than said value. Another factor that affects the grinding speed is the height h of crushing blades 2. When the rotary grinder 7 has a diameter of 46 mm, the height h of the crushing blade 2 should be between 3~20 mm, most preferably between 7~10 mm. A slow grinding may occur if h is less than said value, while the device tends to get blocked if h is greater than said value so that it fails to run correctly.

Figure 5A:
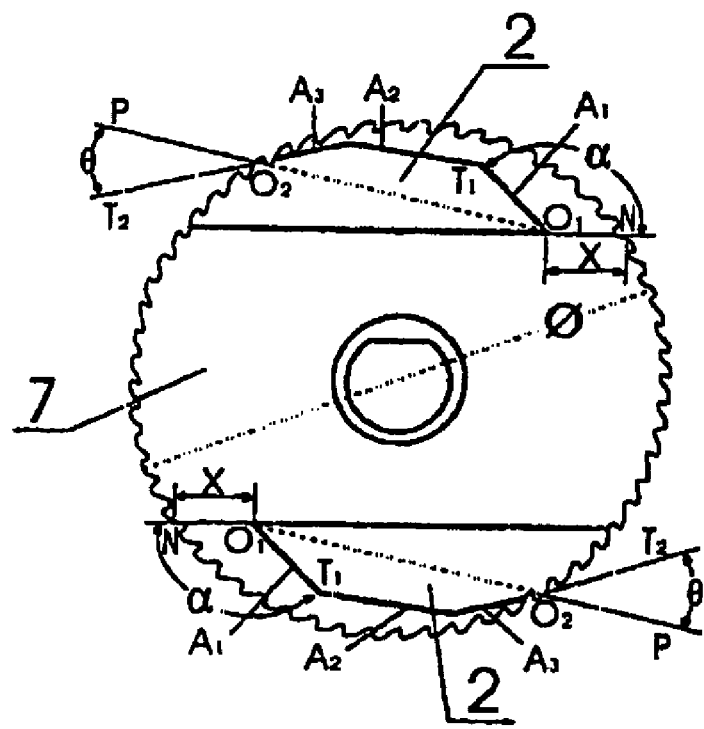
FIG. 5a-5b are top plan views of a crushing blade.
Figure 5B:
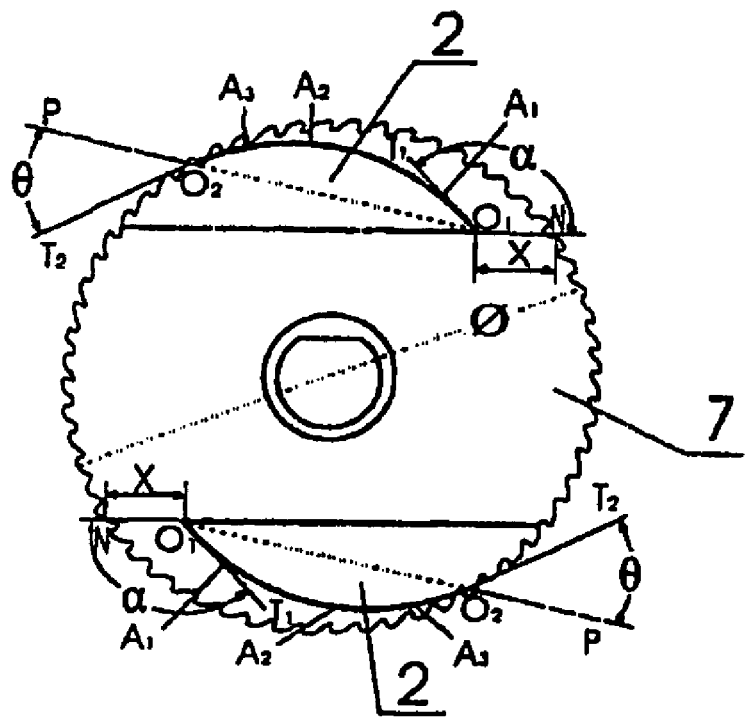
Figure 6A:
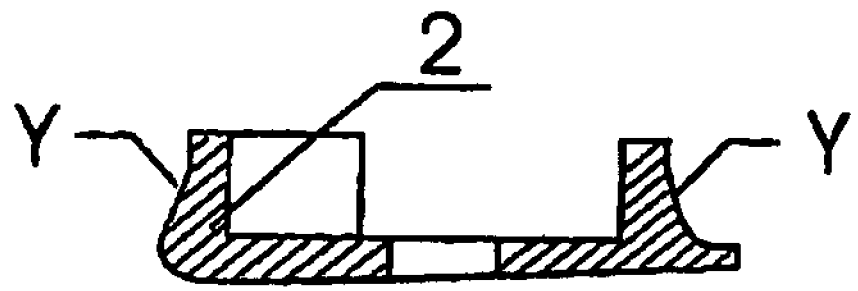
FIGS. 6a-6c are vertical cross-sectional views of three kinds of crushing blade.
Figure 6B:
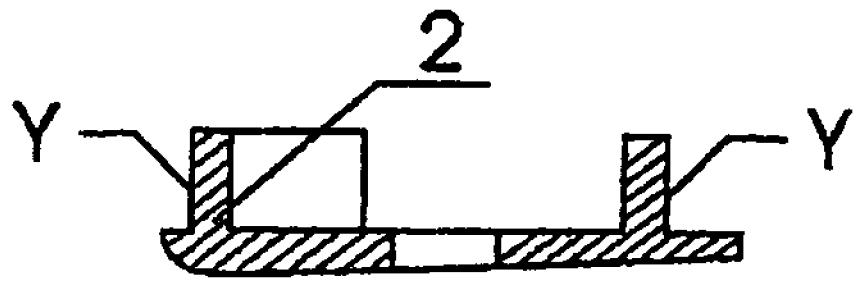
Figure 6C:
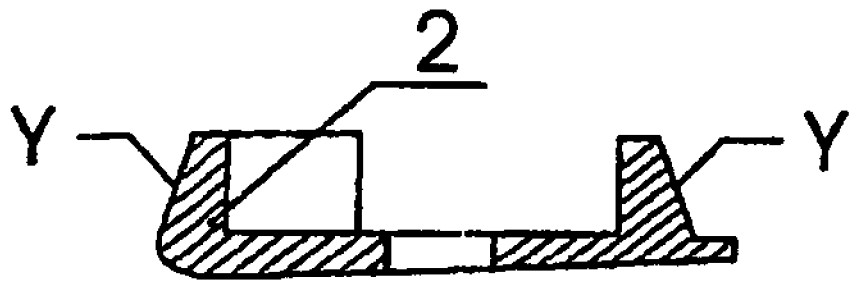

Meanwhile, the shape of the crushing blade 2 can also affect the grinding speed. A preferred structure of the crushing blade 2 is shown in FIG. 5a or 5b. A crushing blade 2 includes a main blade area $A_1$, a transition area $A_2$, and a secondary blade area $A_3$. The outer edges of these areas can be broken lines as shown in FIG. 5a or a curved line as shown in FIG. 5b, with smooth transition at the connections of said broken lines. The main blade area $A_1$ serves to pre-crush and take in the material particles, the transition area $A_2$ serves to transit the pre-crushed material to the secondary blade area $A_3$, and the secondary blade area $A_3$ serves to eventually feed the delivered material to the crushing chamber between the rotating and stationary grinder. Said main blade area $A_1$ of the crushing blades has an inclination α, i.e. $\angle T_1 O_1 N$, of 100°~165°, most preferably 135°~145°, while the rake angle θ of secondary blade area $A_3$, i.e. $\angle PO_2 T_2$, is 10°~70°, most preferably 35°~50°; a distance from the crushing blade vertex $O_1$ of the feed inlet of the main blade area $A_1$ to the outer edge N of the rotary grinder 7, i.e. X, is 2~15 mm, most preferably 3~8 mm, and X is most preferably between 6.5~7.5 mm when the diameter φ of the rotary grinder 7 is 46 mm. This distance can lead to an optimum feed angle and improvement of the grinding speed of the device. The vertical contour line Y of the crushing blade 2 can be an arc line shown in FIG. 6a or a straight line shown in FIG. 6b or 6c which may be employed for different grinding materials, no matter the crushing blade 2 has a configuration of FIG. 5a or FIG. 5b.

In the present embodiment, the rotary grinder 7 and stationary grinder 6 are both of formed with spurs, with a 0.03~0.6 mm dynamic gap between the rotary grinder 7 and the stationary grinder 6; the rotary grinder 7 and stationary grinder 6 can also have a skewed-tooth or tapered-tooth configuration; they can be single stepped or multiple stepped; the cross-section of the teeth may be rectangular, stepped-shaped, or of taper.

The fine grinding section consisting of the stationary grinder 6 and rotary grinder 7 can also be replaced by a pair of millstones counter-rotating with each other, and the grinding surface thereof may be horizontal.

The coarse crushing section and fine grinding section of the crushing and grinding device may be integrally formed as shown in FIG. 1, and they may separate from each other, for example, the crushing blade 2 may be separately mounted on the motor shaft 10. In another preferred embodiment of an integral structure, the gap between the top ends of the stationary grinder 6 and the rotary grinder 7 can be enlarged to form a V-shaped opening, so as to directly form the coarse crushing section which, in place of the crushing blade 2, primarily crushes the material particles and makes them enter into the fine grinding section downstream for further grinding. The gap size of the opening depends on the size of material particles to be crushed.

The impeller 8 of the pump employed in the recirculating system can also be an independent impeller and is mounted on the motor shaft 10. Said pump can be any suitable liquid pump in the prior art, which can also be mounted outside the grinding chamber.

The steps for the crushing and grinding process are as following:

(a) putting the liquid-like materials or materials that contain liquid which are to be crushed into the hopper 1;

(b) initiating the motor according to programmed procedures through the circuit controller 22 so as to drive the rotary grinder 7, the crushing blades 2 at the top of the rotary grinder and the impeller 8 of the impeller pump, and the control valve assembly 19 is set to circulation state;

(c) under the suction of the impeller 8 of the impeller pump, the material crushed by the crushing blade 2 and ground between the rotary grinder 7 and stationary grinder 6 is fed back into the hopper 1 by passing through the expelling outlet 24, the outlet duct 17, the control valve assembly 19 and the recirculating duct 18;

(d) when the material meets the milking production standard after continuous recirculation through the crushing and grinding part, the circuit controller 22 operates the control valve assembly 19 according to the programmed procedures so that the control valve assembly 19 is in a state to discharge the slurry, the slurry then is discharged from the slurry discharge duct 20;

(e) the circuit controller 22 controls the motor according to the programmed procedures so that the motor is in a stand-by state, and the whole grinding process is finished.

After the slurry has been completely discharged, a cleaning process can be started. The device can be cleaned automatically by adding cleaning liquid from the hopper then repeating the above-described process.

Of course, for some materials, to meet the crushing requirements, upon using of the present crushing and grinding device, repeated crushing and grinding is not necessary. In this case, the present crushing and grinding device can directly discharge the crushed and ground materials under the control of the control valve 19.

According to the prior art, the rotary grinder 7 can also be connected to the motor shaft through a coupling joint. Obviously, the structure of this coupling arrangement is relatively complex, and it brings about a higher installation requirement.

Embodiment 2

Figure 7:
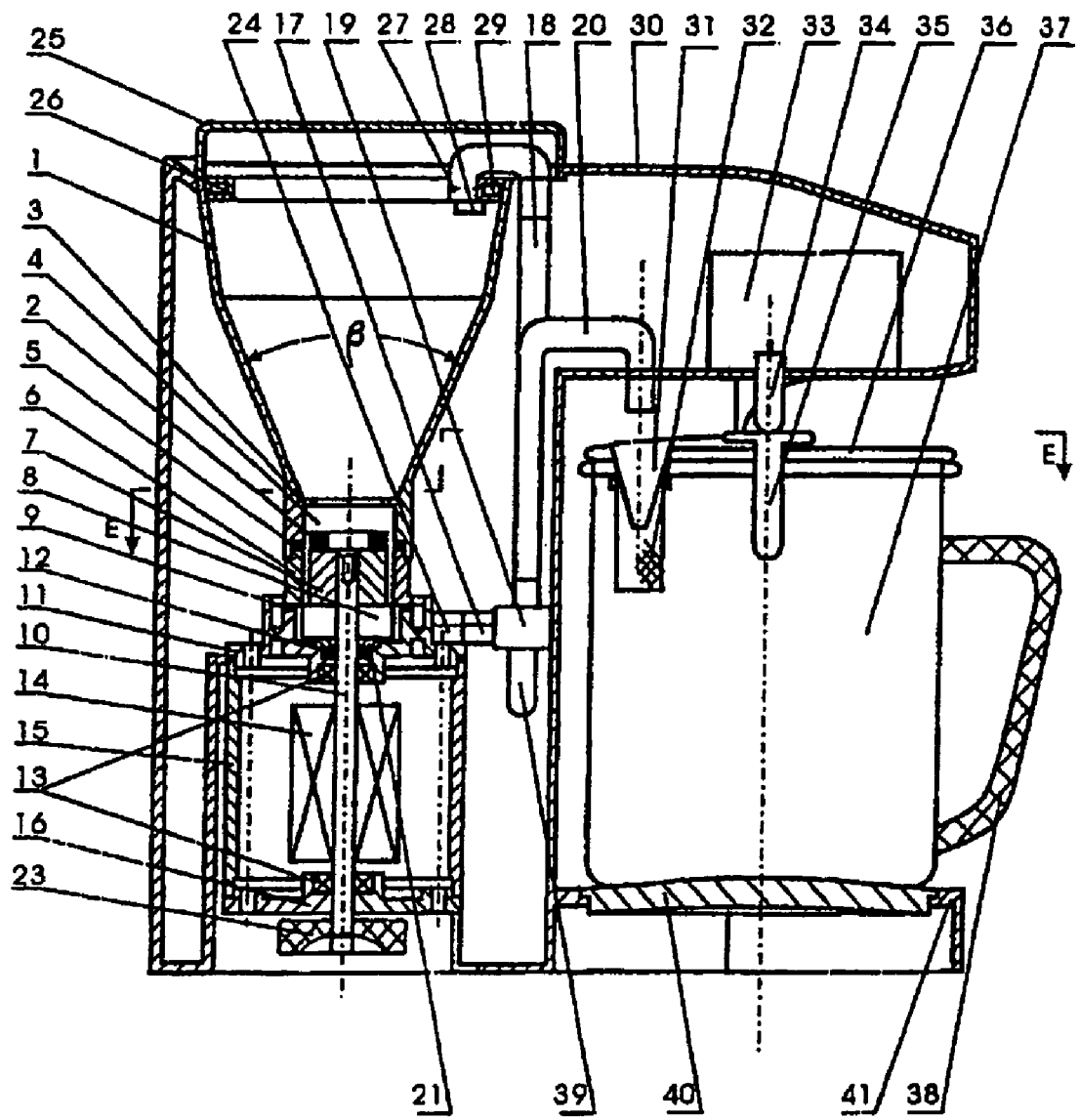
FIG. 7 is a cross-sectional view of an embodiment of the soybean milk maker according to the present invention.
Figure 8:
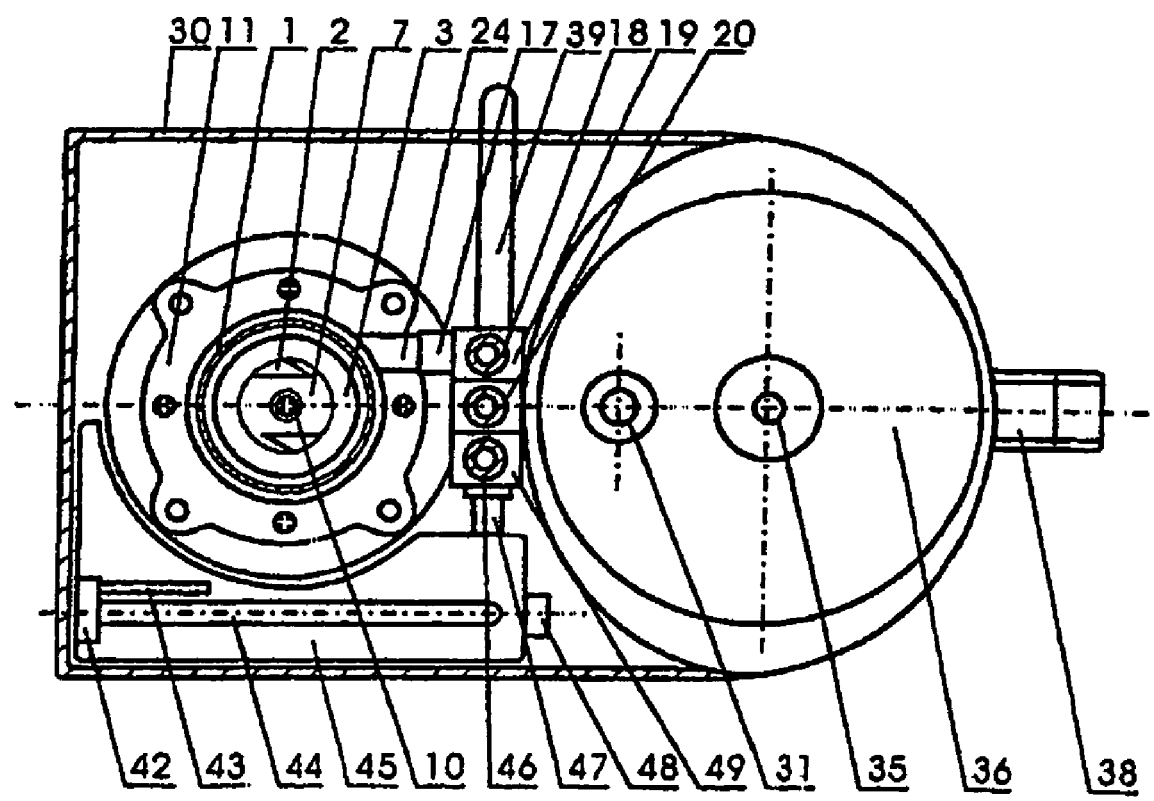
FIG. 8 is a staggered sectional view along line E-E of FIG. 7.
Figure 9:
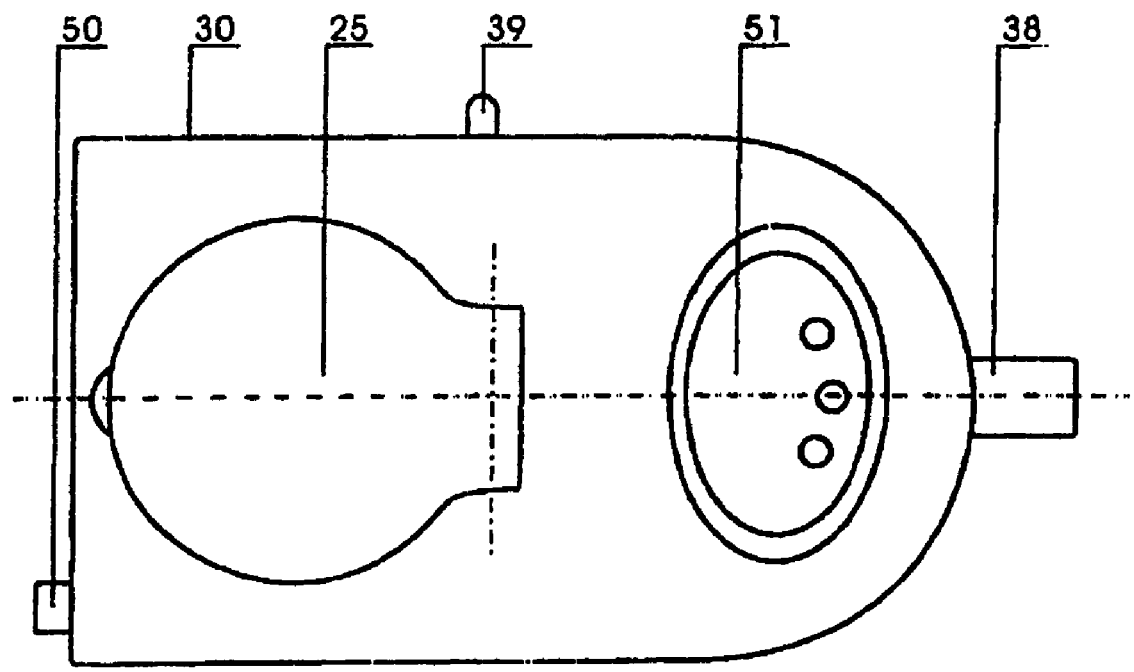
FIG. 9 is a top plan view of FIG. 7.

As shown in FIGS. 7, 8, 9, a preferred embodiment of soybean milk maker according to present invention comprises a milk-producing section, a milk-boiling section and a circuit control system:

(a) The milk-producing section consists of a milk-producing device, a water supplying system, a recirculating system, a motor and a control circuit board. The milk-producing device mainly takes the form of the crushing and grinding device according to Embodiment 1 to crush and grind beans and peas materials, wherein the structures, shapes and connections of the hopper 1, crushing blades 2, retainer ring 3, crushing chamber 4, top seal ring 5 of the stationary grinder, stationary grinder 6, rotary grinder 7, impeller 8, bottom seal ring 9 of the stationary grinder, motor shaft 10, motor front cover 11, seal ring 12 of the motor shaft, bearing 13 of the motor shaft, motor rotor 14, motor casing 15, motor back cover 16, outlet duct 17, capping 21 for the seal ring of the motor shaft and fan blade 23 are all same as those in the crushing and grinding device of Embodiment 1, or may employ other alternative arrangements described in Embodiment 1. The water supplying system consists of a water tank 45, a water pump 49, an inlet duct 47 of the water pump, an outlet duct 46 of the water pump, a water intake valve 50, a water feeder 26 and an inlet duct 27 of the water feeder. A heating device is provided in the water tank. A fixing plate 42 for the heating device and a water level sensor 48 are secured on the wall of the water tank 45, and an electrical heating tube 44 and a temperature sensor 43 are inserted on the fixing plate 42 for the heating device. The water intake valve 50 is connected with the water tank 45. The recirculating system consists of the impeller 8 of the impeller pump, a recirculating duct 28 for feeding slurry, the outlet duct 17, the recirculating duct 18, the slurry discharge duct 20 and a drain duct 39. An electrically controlled change valve may be taken as the control valve assembly 19. A boiling cup 37 communicates with the other outlet of the electrically controlled change valve via the discharge duct 20. The expelling outlet 24 is connected with the outlet duct 17, while the other end of the outlet duct 17 is connected to the inlet of the electrically controlled change valve. One end of the recirculating duct 18 is connected with an outlet of the electrically controlled change valve, and the other end thereof connected with the recirculating duct for feeding slurry 28 secured on the water feeder 26. One end of the slurry discharge duct 20 is connected with the other outlet of the electrically controlled change valve, and the other end thereof is coupled to the slurry inlet 31 on the cap 36 of the boiling cup with the centers thereof aligned. One end of the drain duct 39 is connected to a drain device (not shown in Figures, may be a container, or a connecting duct leading to a cloacae), and the other end thereof is connected to an outlet of the electrically controlled change valve. The control circuit board 33 is connected with the motor and the electrically controlled change valve. The water feeder 26 is clapped on a hopper cover 25. An outlet duct 46 of the water pump is connected with the inlet duct 27 of the water feeder 26. The water feeder 26 distributes water so that water flows down along walls of the hopper 1.

(b) The boiling cup 37 of the milk-boiling section is provided on an electrical heating discus 40. The bottom of the boiling cup 37 is preferred to be spherical, and said sphere R is preferred to be consistent with the top sphere R of the electrical heating discus 40 so as to achieve a larger thermal conducting area. The electrical heating discus 40 is fastened on a base 41 by screws. The slurry inlet 31 fixed on the cap 36 of the boiling cup is coupled to the slurry discharge duct 20 with centers thereof aligned. While an anti-overflow electrode 35 fixed on the cap 36 of the boiling cup is connected with an anti-overflow electrode support 34 secured on the housing 30 in the manner of elastic contact. In addition, the electrical heating discus 40 can also be embodied as an electromagnetic heating component. The boiling cup 37 may be taken off by means of a handle 38 of the boiling cup.

(c) The circuit control system consists of a control circuit board 33 and a control panel 51. The control circuit board 33 is connected with the motor, the electrically controlled change valve, the water pump 49, the water intake valve 50, the electrical heating tube 44 and temperature sensor 43 in the water tank 45, the water level sensor 48 on the water tank 45, the electrical heating discus 40, the anti-overflow electrode support 34, and the control panel 51 provided on the housing 30, respectively (neither connecting wires nor specific structure of the control circuit board are shown in Figures, and it is not difficult for an ordinary person skilled in the art to realize these features), to control the processes, such as feeding water into the water tank, heating water in the water tank, feeding the hopper with water, and so on. To facilitate a user to disassemble and use the soybean milk maker according to present invention, and to guarantee safety and sanitary condition, the hopper cover 25 of the milk producing device in the soybean milk maker according to the present invention is preferably connected with the housing 30 through a hinge structure, and all ducts are made of special food-safe materials. In addition, all of the ducts interconnects with each other through inserting & snapping structures.

When the water feeder 26 supplies water to the hopper 1, in order to facilitate the materials to flow downward more smoothly, especially to facilitate cleaning the milk producing, it is preferred to connect the inlet duct 27 of the water feeder to the water feeder 26, and to provide blowholes 29 on the water feeder 26, through which water is supplied to the hopper 1, more specifically, the water is sprayed to the inner walls of the hopper by the blowholes. Thus not only materials adhered on the inner wall of the hopper 1 can be rinsed off, which is advantageous for the down-flow of the material, but also foams produced in the hopper 1 is reduced during the recirculating milk producing process.

Turn on the soybean milk maker, then the control circuit board 33 gets into its operating state and gives an instruction to the water intake valve 50 to automatically feed water into the water tank 45. When the water level reaches the design value, the water level sensor 48 on the wall of the water tank 45 sends a signal to the control circuit board 33, and the control circuit board 33 gives an instruction to the water intake valve 50 to stop water feeding (the operating principle of such a device is similar to that of a water-feeding device in a fully-automatic washer of prior art, and will not be described here), then the soybean milk maker gets ready for the next operation procedure which was described above. Thus, the degree of automation is improved and the equipment is more convenient to use.

In a preferred embodiment of a soybean milk maker according to the present invention, as shown in FIG. 7, a filter 32 is screwed on the slurry inlet 31 of the cap 36 of the boiling cup. Said filter 32 can either be a rigid filter mesh or a flexible filter bag, which is used for filtering the soybean slurry to fit the taste of a user who favors a finer soybean milk. The filter 32 may be taken off from the slurry inlet 31 while cleaning, and may be screwed on the slurry inlet 31 after cleaning. The operation is easy and convenient.

The control valve assembly 19 may also be configured as an electromagnetic valve assembly. But an electrically controlled change valve, compared with an electromagnetic valve assembly, which is employed in a soybean milk maker would lead to a space saving and reduction in parts numbers. Since the valve body of a change valve cannot keep water or sediments, and opening, closing, changeover, sealing thereof are more reliable, the lifespan of the soybean milk maker is extended.

The milk producing procedures of a soybean milk maker according to the present invention are:
(1) feeding soaked soybeans or dry soybeans into the hopper, then turning on the power via the control panel;
(2) feeding water into the water tank, and pre-heating the water to a predetermined temperature under the control of the control circuit board;
(3) a water pump supplies heated water to the hopper, and a motor of a recirculating crushing and grinding device operates to produce slurry;
(4) under the control of the control circuit board, the final soybean milk produced according to the design procedures is discharged into the boiling cup and boiled therein then poured out for drinking;
(5) the water pump is controlled by the control circuit board to feed the hopper with water once again, the motor of the recirculating crushing and grinding device is operated to clean the recirculating crushing and grinding device, and dirty water is discharged through the drain duct; and,
(6) the control circuit board 33 controls the equipment so that the equipment is in a stand-by state, and all processing procedures are finished.

What is claimed is:

1. A crushing and grinding unit for crushing and grinding liquid-like materials or materials that contain liquid, said unit comprising a coarse-crushing section and a fine-grinding section, wherein said fine-grinding section comprises a stationary grinder and a rotary grinder, said coarse-crushing section is located in a chamber of the stationary grinder, and said coarse-crushing section includes a crushing blade, wherein a gap between the outer side surface of the crushing blade of the coarse-crushing section and the inner surface of the stationary grinder chamber gradually decreases from the leading portion of the blade to the base portion of the blade, thereby a crushing chamber is formed, and wherein the crushing blade includes a main blade area, a transition area and a secondary blade area, outer edges of these areas being defined by broken lines or curved lines, and the connections of said broken lines are smoothly transitioned, said main blade area has an inclination ($\alpha$) of approximately 100° to 165°, while an inclination ($\theta$) of the secondary blade area is approximately 10° to 70°, and a distance (X) at a feeding inlet of the main blade area is approximately 2 to 15 mm.

2. The crushing and grinding unit according to claim 1 wherein the crushing blade has a height (h) of approximately 3 to 20 mm, when the diameter of the rotary grinder is 46 mm.

3. The crushing and grinding unit according to claim 1 wherein said rotary grinder and stationary grinder both comprise teeth in the form of spurs, and a gap between said rotary grinder and stationary grinder is in a range of approximately 0.03 to 0.6 mm.

4. A crushing and grinding device for crushing and grinding liquid-like materials or materials that contain liquid, said device comprising a motor, a hopper, a material recirculating part, and a crushing and grinding unit as claimed in one of claims 1, 2, or 3, and wherein said material recirculating part consists of a pump and recirculating ducts downstream of said crushing and grinding unit.

5. The crushing and grinding device according to claim 4, wherein said pump is an impeller pump, and the impeller of said impeller pump is located below the rotary grinder and is fitted on a common shaft with the rotary grinder.

6. The crushing and grinding device according to claim 5, wherein said impeller of said impeller pump is integrally formed with the rotary grinder.

7. The crushing and grinding device according to claim 4, wherein a retainer ring is provided at the bottom end of the hopper.

8. The crushing and grinding device according to claim 7, wherein the inner diameter of said retainer ring is approximately 15 to 50 mm, when the rotary grinder has a diameter of 46 mm.

9. The crushing and grinding device according to claim 4, wherein the crushing chamber has a height (H) of approximately 10 to 35 mm.

10. The crushing and grinding device according to claim 4, wherein said hopper has a repose angle ($\beta$) of approximately 25° to 40°.

* * * * *